June 27, 1967 L. R. DAVIS 3,327,613
BEVERAGE BREWING APPARATUS
Filed April 24, 1964 5 Sheets-Sheet 1

INVENTOR.
Loren R. Davis
BY Synnestvedt & Lechner
ATTORNEYS

INVENTOR.
Loren R. Davis
BY
Synnestvedt & Lechner
ATTORNEYS

June 27, 1967  L. R. DAVIS  3,327,613
BEVERAGE BREWING APPARATUS
Filed April 24, 1964  5 Sheets-Sheet 5
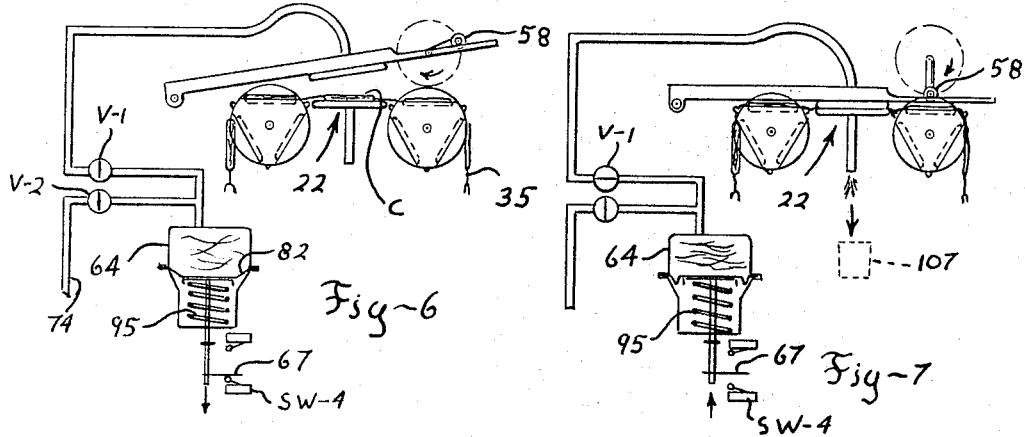
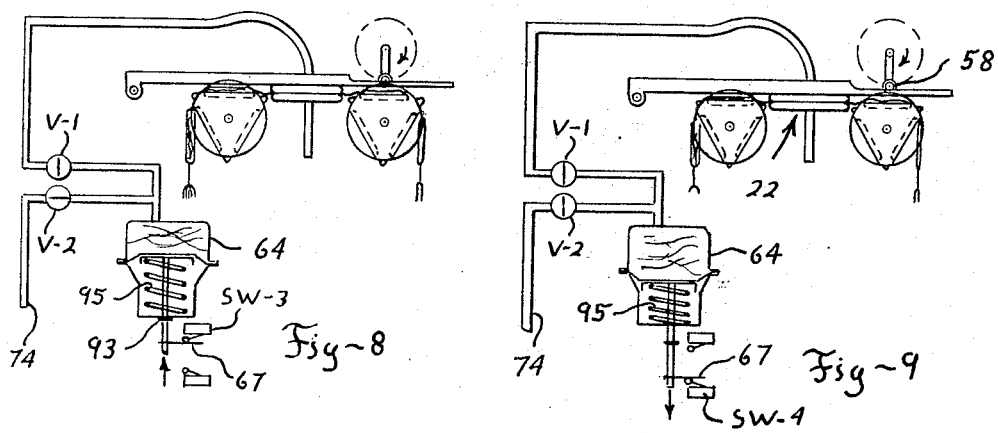
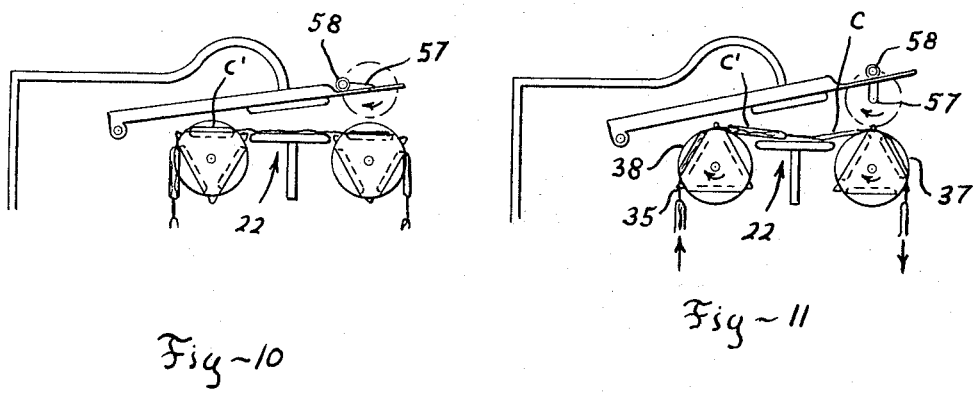
INVENTOR.
Loren R. Davis
BY
Synnestvedt & Lechner
ATTORNEYS

United States Patent Office 3,327,613
Patented June 27, 1967

3,327,613
BEVERAGE BREWING APPARATUS
Loren R. Davis, Newtown, Pa., assignor to Rudd-Melikian, Inc., Warminster, Pa., a corporation of Pennsylvania
Filed Apr. 24, 1964, Ser. No. 362,418
12 Claims. (Cl. 99—282)

This invention relates to an apparatus for brewing beverages, such as coffee, from hot water. According to the invention the beverages are preferably brewed in individual servings such as a single cup.

Although a number of features of the invention are useful with beverage brewing arrangements in which the beverage material is handled in various ways, the invention is particularly useful in connection with beverage tapes of the general kind disclosed and claimed in copending U.S. application Ser. No. 174,640 of Zimmerman and Davis, now Patent No. 3,209,676, assigned to the same assignee as this application. As explained more fully in that application, the beverage material, such as coffee, is arranged in cartridges which are spaced along a tape made of permeable material, such as filter paper. The tape is provided with indexing means to assure that each pod or cartridge is accurately positioned in the brewing chamber of the apparatus in which the tape is used. Each cartridge on the tape contains sufficient beverage material to make a single serving, and the tape is most advantageously used in a machine which advances successive cartridges into the brewing chamber and at the same time removes spent cartridges therefrom.

When cartridges of beverage such as those described above are employed, and when certain other arrangements of beverage material are used, the material is compressed together into a dense compact mass. One consequence of this is that the brewing water must be forced through the beverage material under some pressure, if it is desired to obtain the beverage in a convenient length of time.

The present invention involves an apparatus having the capability of brewing a good quality beverage in sequential servings by forcing a measured quantity of hot water through a predetermined mass of beverage material under pressure.

According to one of the aspects of the invention, the pressure normally available in building water lines is utilized to force the hot water through the beverage material.

One of the objects of the present invention is to provide an improved apparatus for brewing beverages.

Another object of the present invention is to provide a beverage brewing apparatus which utilizes the energy stored in the building water lines for forcing the brewing liquid through the beverage material.

Still another object of the present invention is the provision of a beverage brewing machine having an improved hot water unit for heating and storing hot water, for metering the proper quantity for brewing purposes, and for forcing that quantity of hot water through the beverage material.

It is an object of the present invention to provide an automatic beverage brewing apparatus having an automatically operated hot water unit powered by water line pressure and coordinated in operation with the other parts of the brewing apparatus.

It is an object of the present invention to provide a brewing apparatus for making a beverage by forcing hot water under pressure through a mass of beverage material, in which the requirement for a hot water pump has been eliminated.

The above objects and purposes together with other objects and purposes can best be understood by considering the following detailed description together with the accompanying drawings in which:

FIGURES 6 through 11 are a series of diagrammatic elevational views showing successive stages in the sequence of operation of the apparatus of the invention.

Figure 1:
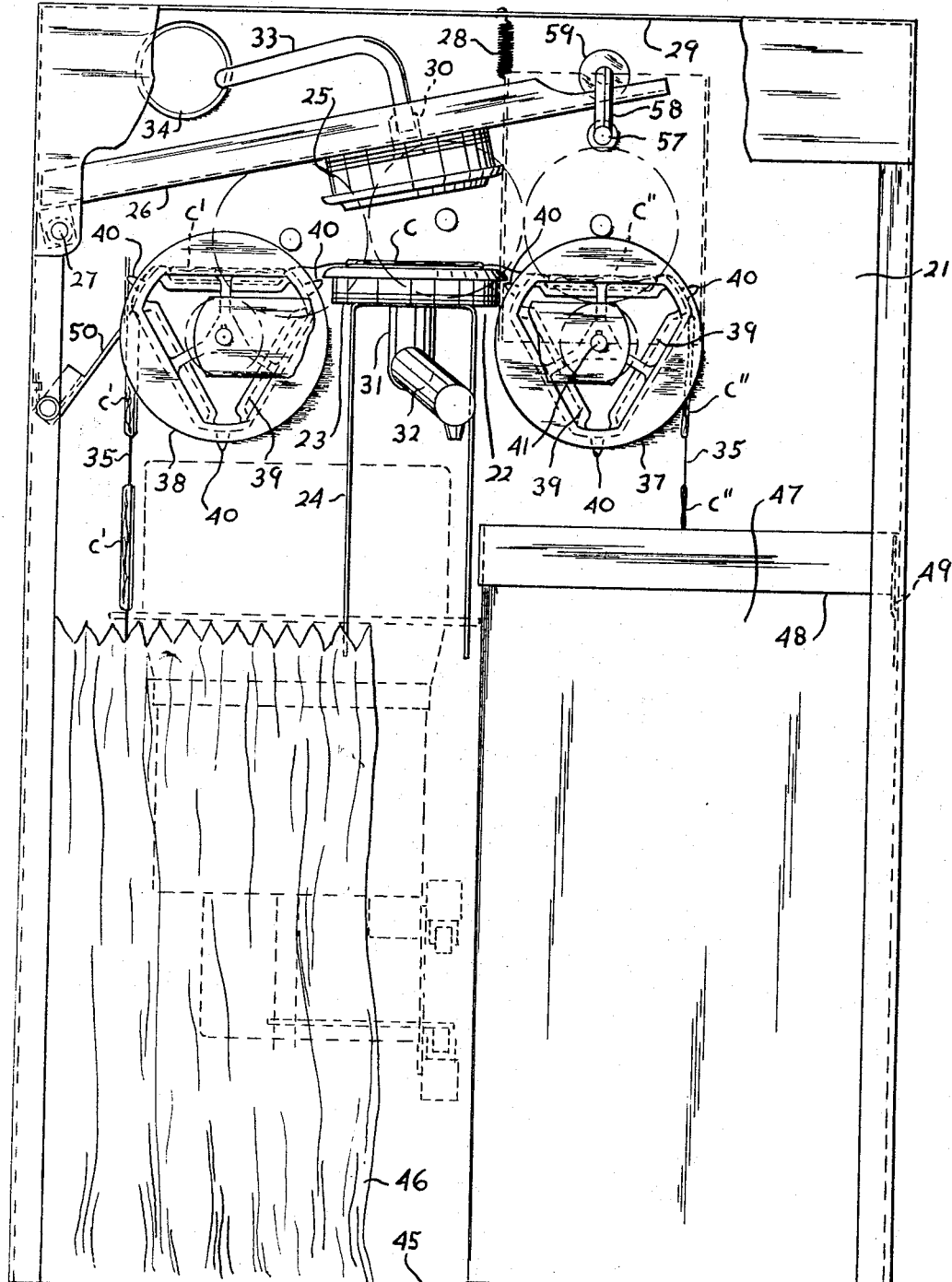
FIGURE 1 is a front elevational view, with some parts broken away, of a brewing apparatus constructed in accordance with the invention.
Figure 2:
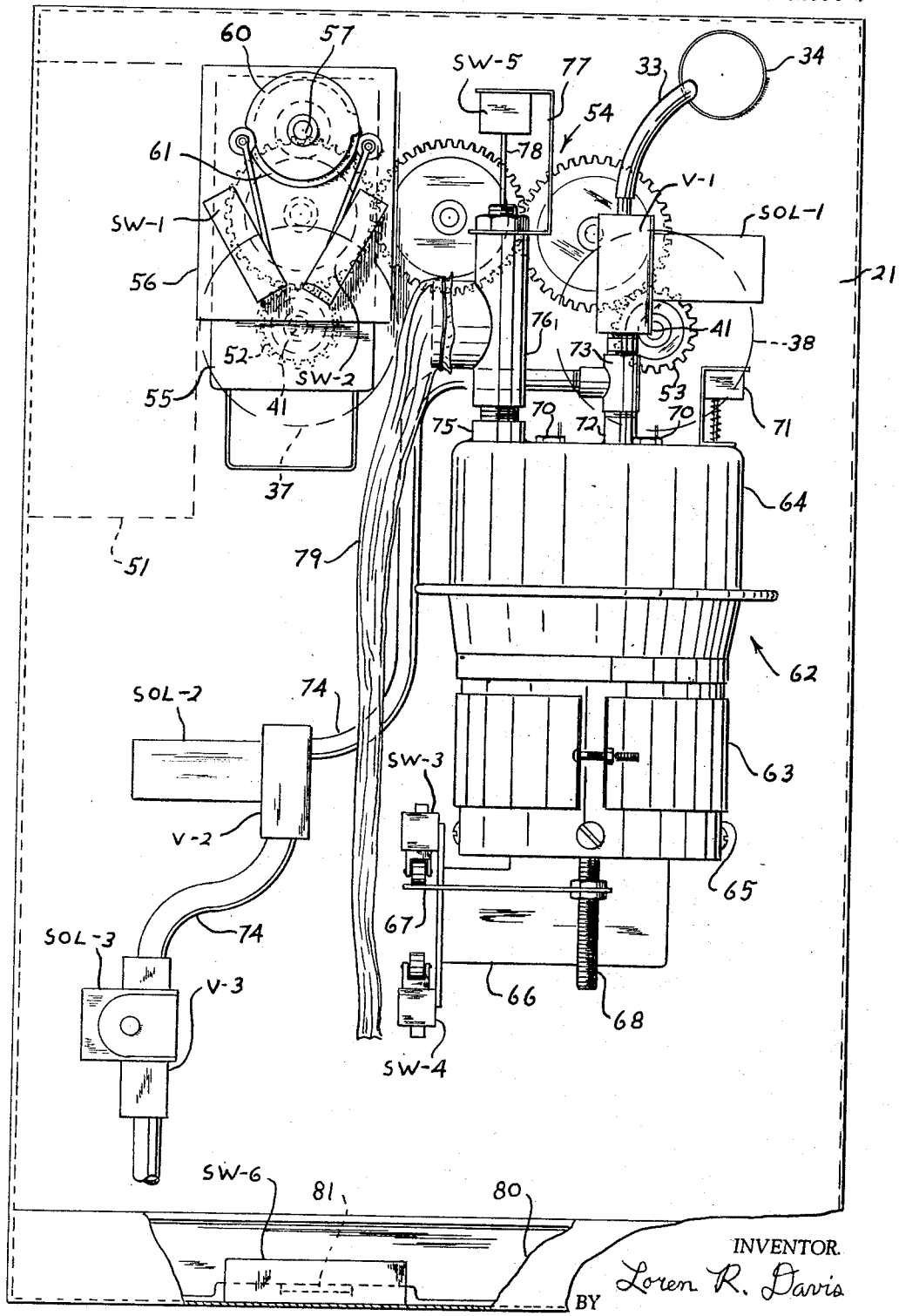
FIGURE 2 is a rear elevational view of the brewing apparatus shown in FIGURE 1.
Figure 4:
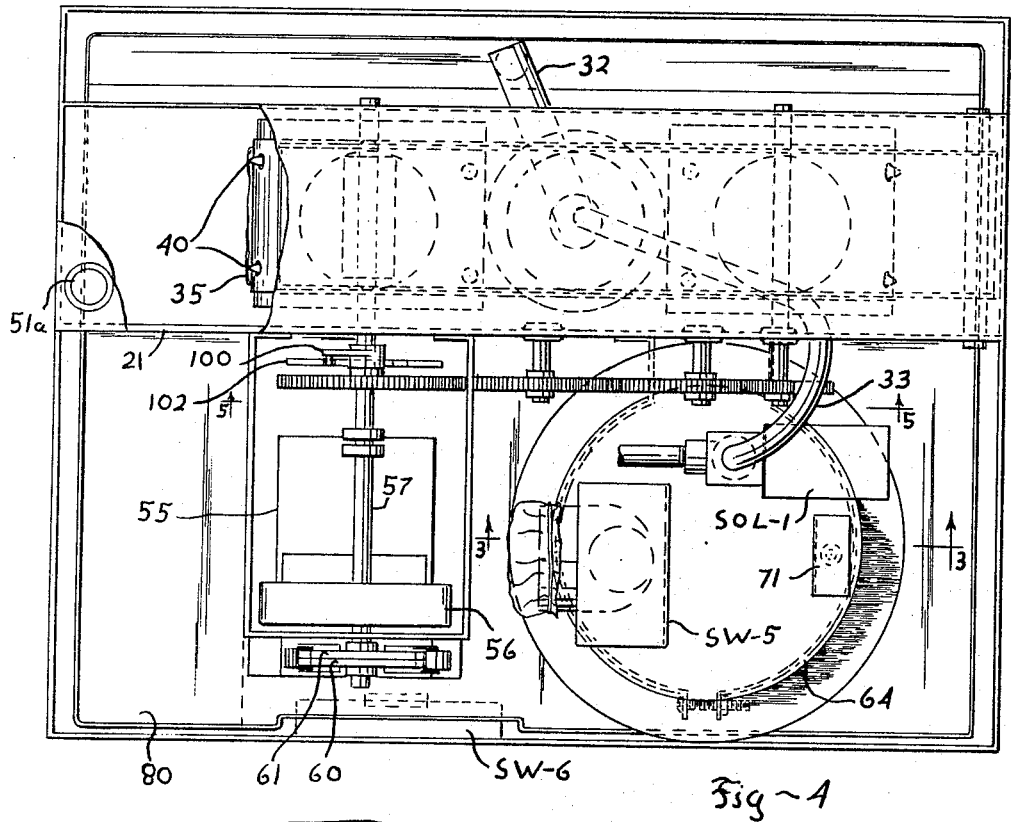
FIGURE 4 is a top view of the apparatus shown in FIGURES 1 and 2 with certain of the parts omitted for purposes of clarity.

Attention is first directed to FIGURE 1. As can be seen in that figure the brewing apparatus is provided with a base 20 upon which is mounted a generally rectangular supporting plate 21. As can be seen in the top view of FIGURE 4, the mounting plate 21 is positioned on the generally rectangular base 20 to divide the unit generally into a front compartment and a rear compartment. For the most part, the equipment shown in in full lines in FIGURE 1 is in the front compartment, and that shown in full lines in FIGURE 2 is in the rear compartment. If desired, a housing, which is not shown, can be provided to enclose the entire unit. Such a housing is desirably generally in the shape of a rectangular prism.

In the upper part of the front compartment, there is located the brewing housing or chamber designated generally as 22. In the preferred embodiment it consists in part of a lower member 23 which is mounted on support plate 21 by a bracket 24. The remainder of the brewing chamber is formed by upper member 25 which is carried on pivot arm 26. The pivot arm 26 is in turn pivotally mounted on the mounting plate 21 by means of pivot mounting 27. When the pivot arm is rotated generally clockwise as shown in FIGURE 1, the lower member 23 and upper member 25 of the brewing housing are brought into engagement with each other to form a closed brewing chamber surrounding a cartridge of coffee C positioned therein. The pivot arm is biased to a raised position by spring 28 which is connected between the arm and frame 29 which runs around the margin of the support plate 21. In the raised position, which is shown in FIGURE 1, the upper part 25 of the brewing housing is held in a position spaced away from the lower part 23.

The upper member 25 of the brewing housing has an inlet port 30 through which hot water is admitted to the brewing chamber. A hot water feed line 33 runs generally between the hot water unit in the rear compartment of the apparatus and the inlet port 30. It passes through a hole 34 in the mounting plate 21. The lower member 23 has an outlet port 31 through which the beverage which has been brewed flows from the brewing chamber. Connected to the outlet port 31 is a spout 32 which projects outwardly from the plane of the drawing in FIGURE 1 so that a cup may be held beneath the spout to receive the freshly brewed beverage.

The beverage cartridge C which was mentioned above may be formed in several ways and may be of several configurations. However, as explained briefly above, the preferred form of the present invention is designed for use with cartridge tapes containing a plurality of beverage cartridges such as C spaced along the tape. In FIGURE 1 the tape appears at 35. It carries a plurality of cartridges spaced uniformly therealong; the cartridge in the brewing chamber is designated C while the fresh cartridges which have not yet been moved to the brewing chamber are marked C'. The spent cartridges which have been removed from the brewing chamber are marked C". The tape is sequentially fed through the brewing chamber from left to right as shown in FIGURE 1.

In the feeding of the tape it is very important that it be advanced the proper distance to locate the next cartridge C in the correct position on the lower member 23 of the brewing chamber. If the tape is not indexed into position correctly, the brewing chamber is in danger of not closing tightly and the water which is forced through it under pressure will spray out through the faulty seal. For this reason, and as more fully explained in the beforementioned U.S. application Ser. No. 174,640, indexing means in the form of indexing holes are provided on the tape 35 in preselected positions with respect to the cartridges C on the tape. The indexing holes appear most clearly in the top view of FIGURE 4 at 36. Two feeding and indexing members are provided for the dual purpose of advancing the tape 35 and precisely positioning it. In FIGURE 1 the right-hand indexing member is designated 37 and the left-hand member 38. These members are coordinated in their movements by means of a drive train which will be more fully described later. As can be seen in FIGURE 1, each indexing member is generally in the shape of a triangular prism with a cartridge receiving cavity 39, on each face of the prism. At the corners of the prism, which are flattened somewhat, are mounted indexing pins 40 which engage the indexing holes 36 on the tape. The indexing members are stopped in their movement at a preselected point so that the indexing pins are at preselected positions with respect to the brewing chamber. By this means the cartridge C is accurately located within the chamber. The indexing members 37 and 38 are each mounted for rotation about their axes on shafts 41 which are journaled through supporting plate 21.

A floor plate 45 is provided for the front compartment. It is spaced a short distance above the base 20. A cartridge tape supply container 46 sits on the floor 45 at the left-hand side of the front compartment. On the right-hand side of the front compartment on the lower portion thereof there is located a waste container 47 which is accurately positioned by means of lip 48 and bracket 49 on frame 29. The waste container 47 is positioned to receive the spent tape with used cartridges thereon.

At the left-hand side of the machine a tape guide bar 50 is positioned to urge the incoming tape against indexing means 38.

From the foregoing it can be understood that the path of movement of the cartridge tape 35 through the apparatus as shown in FIGURE 1 is from the supply container 46, which may conveniently be a paper sack, to left-hand indexing member 38 and thence to the brewing chamber 22. From the brewing chamber the cartridge tape moves to the right-hand indexing member 37 and from there to the waste container 47.

The rear compartment of the apparatus is shown in elevation in FIGURE 2. As can be seen in that figure, most of the equipment in the rear compartment is mounted on supporting plate 21. In some installations it is desirable to have a coin mechanism which controls the overall operation of the apparatus in response to the insertion of coins. This piece of equipment, if employed, can readily be mounted in the upper left-hand portion of the rear compartment where it is shown in phantom outline at 51. In other units, the overall control may conveniently be provided for by a starter button (not shown) at the top of the machine.

The indexing means 37 and 38, which are located in the front compartment, are shown in FIGURE 2 in dot and dash outline. The shafts 41 on which indexing means are mounted each protrude through the supporting plate 21 into the rear comparatment. Drive gears 52 and 53 are connected to the shaft 41 for indexing means 37 and 38 respectively. A drive train designated generally as 54 which includes several gears and which will be described in greater detail later, connects the drive gears 52 and 53 with motor 55. The drive train includes a gear box 56, the internal works of which are not shown since they are of a well known type construction. The main output of the gear box is at shaft 57. This shaft protrudes from the gear box in two directions, as can best be seen on FIGURE 4. One portion of the shaft extends from the gear box to and through supporting plate 21 into the front compartment. In the front compartment shaft 57 is formed into a crank 58 carrying a roller 59. Upon rotation of shaft 57 through a full revolution, the crank will first depress pivot arm 26 to bring the upper member 25 into sealing engagement with the lower member 23 to form the closed brewing chamber, and upon completion of the revolution will allow the pivot arm to rise once again to its rest position. The portion of the shaft 57 which protrudes from the other side of the gear box 56 carries a pair of cams 60 and 61. The cams 60 and 61 are angularly positioned on shaft 57 to throw the switch arms of switches SW-1 and SW-2 at the appropriate times. These switches form part of the control system for the apparatus which will be discussed later.

Figure 3:
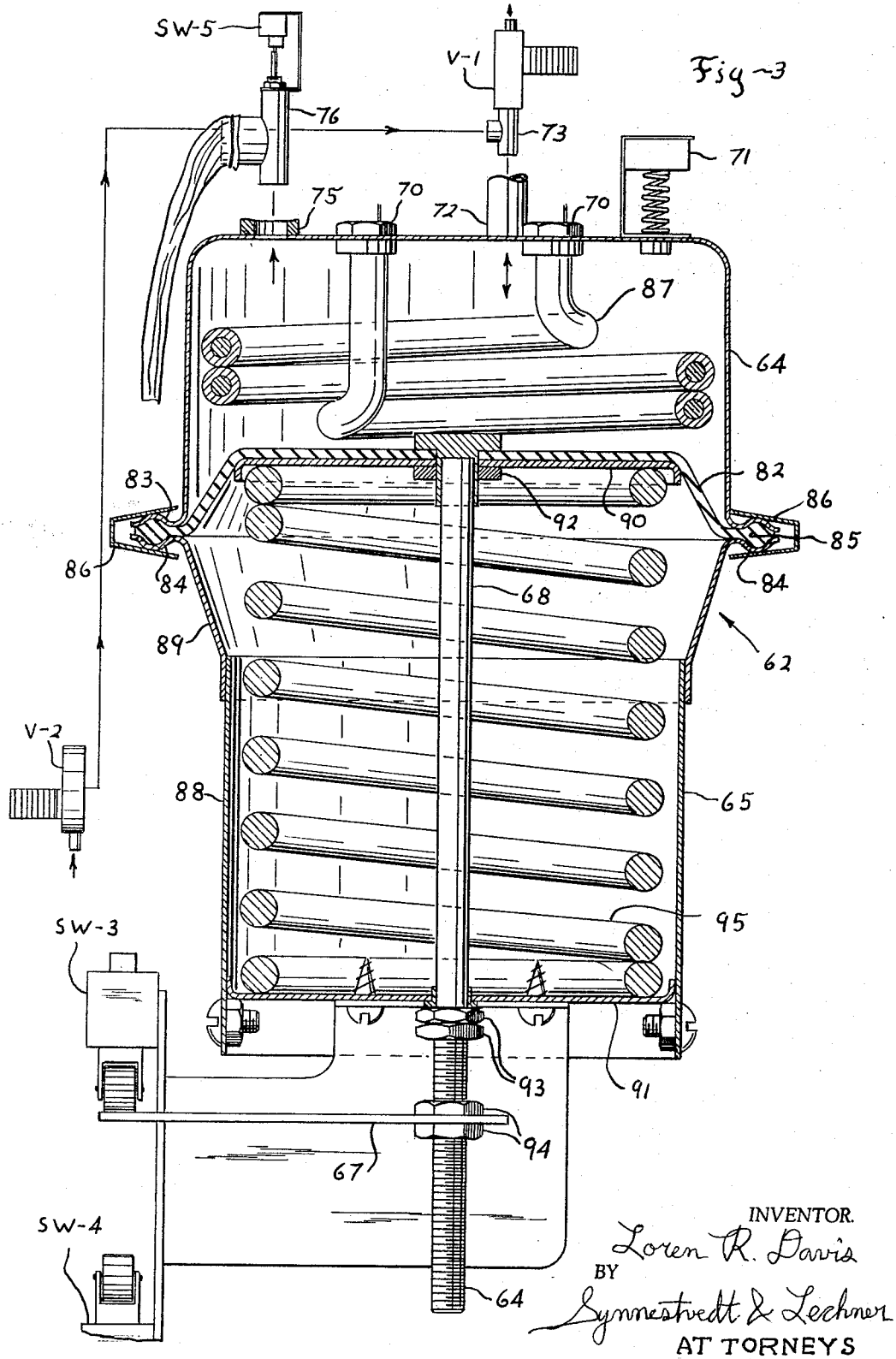
FIGURE 3 is a cross sectional elevational view of the hot water unit of the brewer shown in FIGURES 1 and 2, with certain of the valves which are associated with the hot water unit shown on a reduced scale and somewhat diagrammatically.

The hot water unit, designated generally as 62, is mounted on supporting plate 21 by means of clamp 63. The internal structure of the hot water unit is shown in FIGURE 3, and will be discussed in connection with that figure. The arrangement of the external structure, however, is given in FIGURE 2. The upper portion of the hot water unit 62 is a reservoir 64 and the lower portion is a driven spring housing 65. A mounting bracket 66 depends from the drive spring housing 65. The bracket carries two control switches, SW-3 and SW-4. These switches are actuated by actuating bar 67 which is carried on reciprocating rod 68.

As will be explained later, an electric heating element is mounted within the reservoir portion of the hot water unit. The external contacts of the heating element appear at 70. A control thermostat 71 is mounted on top of the reservoir 64. Various types of thermostats may be used, but a melted wax type unit has been found to be quite suitable for controlling the temperature of the water in the reservoir to keep it at a temperature just below the boiling point. The thermostat is wired to turn the heater on when the temperature falls below a preselected value, and to turn it off when the water temperature exceeds this value.

A piping connection 72 is positioned at the top of the reservoir. A pipe T 73 is fitted to this connection. One leng of the T is connected to a cold water input line 74. The other leg is connected through a nipple to a feed control valve V-1. Valve V-1 is opened and closed by solenoid SOL-1. Feed line 33 runs from valve V-1 to the upper member 25 of the brewing chamber 22 in the front compartment of the apparatus.

Another piping connection 75 is provided in the top of the reservoir 64. To this is fitted, by means of a nipple, a safety valve 76. Safety valve 76 carries a bracket 77 on which is mounted a switch SW-5. The switch is so positioned that it is actuated through pin 78 by the safety valve. The safety valve is of known construction, and is set to open both under conditions of high temperature and high pressure. Thus the valve will open whenever the pressure within the reservoir exceeds a preselected value. Similarly, if the temperature rises to an excessive predetermined value, the valve will open. Switch SW-5 is an upper limit switch which is actuated by pin 78, which is interconnected with the temperature sensing element of the safety valve. Thus switch SW-5 is actuated when the temperature in the reservoir reaches a preselected value. When switch SW-5 is so actuated, it turns the reservoir heater off. In the preferred arrangement the heater remains off until switch SW-5 is reset by hand after correction of the condition which caused the undesirable temperature rise.

A plastic sock 79, which is open at the bottom, is fitted to the outlet of safety valve 76 so that water passing through the valve is conducted to the lower portion of the rear compartment.

Cold water control valve V-2 is positioned in the cold water line 74. This valve is opened and closed by means of solenoid SOL-2. A water supply cut off valve V-3 is also mounted in cold water or input line 74. It is operated by solenoid SOL-3. Cold water from the building utility line is introduced through a connection which is not shown at the lower end of cold water line 74 on the up-stream side of valve V-3.

Certain abnormal conditions in the apparatus can cause water spillage. One example is a sudden surge of pressure in the building water lines. If the pressure exceeds the desired maximum pressure in reservoir 64 at a time when valves V-2 and V-3 are open, the safety valve 76 will open and water will flow out through the sock 79. Other abnormalities can cause water to be spilled in the front compartment of the apparatus also. For this reason a spillage tray 80, made of light weight plastic, is positioned on the base 20 of the machine. It extends under supporting plate 21 so that it covers base 20 in both the front and rear compartments. The front portion of the tray sits on the base 20, but the rear portion is supported by the actuating lever of switch SW-6. When water falls into the tray through sock 79, or from any other source within the apparatus, the tray eventually becomes heavy enough to actuate switch SW-6. When this happens, solenoid SOL-3 closes valve V-3 and the source of cold water is thus closed off. In this way, the danger of a mishap within the machine causing the building water to flow uncontrollably into the apparatus is eliminated.

The interior arrangement of the hot water unit 62 is shown in FIGURE 3. The reservoir 64 is substantially cylindrical in shape. The bottom wall of the reservoir is a diaphragm 82 of rubber or plastic. The material from which the diaphragm is constructed should be chosen to be resistant to the effects of hot water. As shown in FIGURE 3, the reservoir 64 can be considered to be an inverted pan having a peripheral rim 83 with a continuous depression therein. Similarly, the upper portion of the drive spring housing 65 is fitted with a peripheral rim 84 having a depression therein. The diaphragm 82 is provided with a circumferential bead 85 which fits into the depressions on the two rims. Clamping member 86 urges the two rims toward each other. In this way a water tight seal is effected between the reservoir 64 and the drive spring housing 65.

Within the reservoir is an immersion type heating element 87, the contacts 70 of which protrude through the top wall of the reservoir. Piping connections 72 and 75 and thermostat 71 are also fitted to the top of the reservoir 64.

As explained above, the operation of the heater is controlled, in the main, by thermostat 71, with a safety control by switch SW-5. In the preferred arrangement a further control of the heater is provided. The danger of over heating in the reservoir is greatest when the reservoir is at its minimum volume and contains the smallest amount of water. As will be explained later, a minimum volume condition occurs momentarily once during each brewing cycle, but such a condition can also occur as a result of an abnormality such as the opening of the safety valve 76. In any event, the heater is wired through switch SW-3, which is actuated when the reservoir is at minimum volume, so that the heater is disabled whenever the reservoir is at its smallest volume.

The valves and solenoids which were discussed above in connection with FIGURE 2 also appear on FIGURE 3, but are reduced in size in order to simplify the illustration.

The power drive spring housing 65 is generally cylindrical in shape and is desirably formed of a lower tube 88 and a flared upper tube 89. It is the upper tube 89 which is provided with rim 84. A round bearing plate 90 is fitted to the diaphragm 82 on the under side thereof by means of reciprocating rod 68 and nut 92. The bottom of the drive spring housing is closed by bottom plate 91. Reciprocating rod 68 passes through plate 91. The portion which protrudes is threaded. A pair of nuts 93 is mounted on rod 68 to limit the upward movement of the rod. In this way the upper position of the diaphragm 82 is also fixed. Actuating bar 67 is mounted on the external part of rod 68 by means of nuts 94 and its position thereon can be adjusted.

The drive spring 95 is positioned within housing 65 and bears against the bottom plate 91 of the housing and the bearing plate 90 of the diaphragm 82. The spring tends to urge the diaphragm 82 upwardly. That is to say, it acts on the diaphragm in a direction which tends to reduce the volume of the water reservoir 64. When water is admitted through the cold water line 74 into reservoir 64, the force exerted by the water under the pressure of the building water supply will tend to compress drive spring 95 and force diaphragm 82 downwardly until the water inlet valve V-2 is closed. The drive spring 95 will remain compressed until feed valve V-1 is opened to provide a flow path to the brewing chamber. When valve V-1 opens, drive spring 95 will extend and push diaphragm 82 upwardly toward the roof of the reservoir. The upward motion will be stopped by nuts 93 coming in contact with bottom plate 91. Thus is can be seen that the potential energy represented by the line pressure in the building water line has been transferred in part to the drive spring 95 where it is stored until it is needed as kinetic energy to force hot water to and through the mass of coffee or other beverage material in the brewing chamber.

Figure 5:
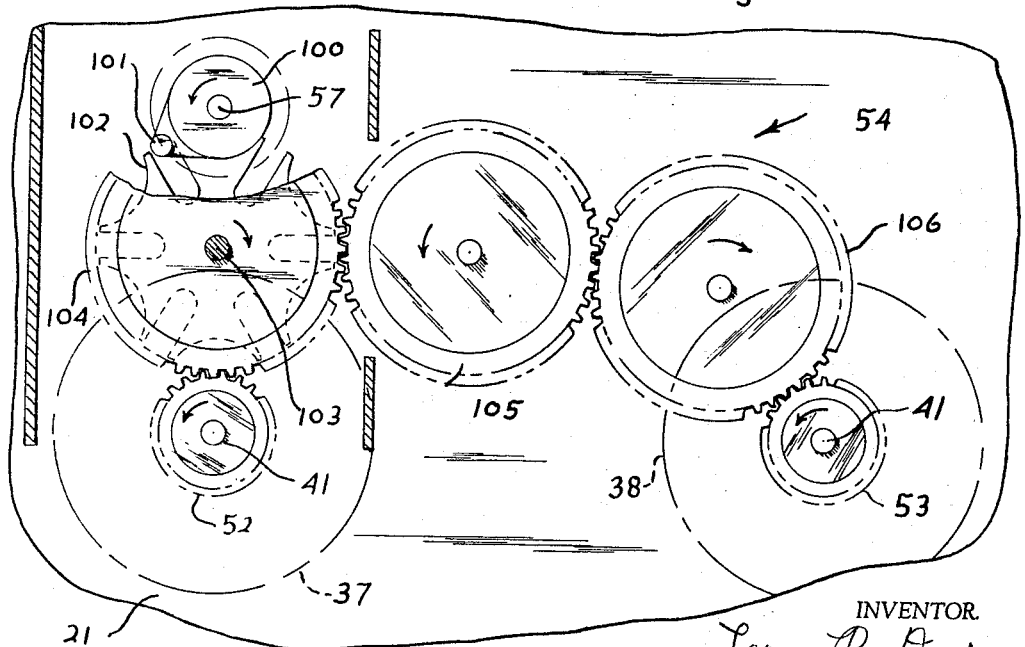
FIGURE 5 is a sectional elevational view of the drive of the brewing apparatus shown in FIGURES 1 and 2, with many of the surrounding parts omitted for purposes of clarity.

Attention is now directed to FIGURE 5 which most clearly illustrates further details of the drive train 54. It will be remembered that the main output shaft from gear box 56 is shaft 57 which carries control cams 60 and 61 and which also carries crank 58. Just before shaft 57 passes through supporting plate 21, there is mounted on it a Geneva driving member 100. The driving member 100 carries a pin 101 which engages the Geneva wheel 102. The Geneva wheel 102 is mounted on a shaft 103 which is journaled through supporting plate 21. The shaft also carries a first gear 104. The first gear 104 engages two other gears. One of these is driven gear 52 which is on shaft 41 which also carries the right-hand indexing member 37 shown in FIGURES 1 and 2. In this manner the motor 55 is drivingly connected to indexing member 37.

The other gear which meshes with first gear 104 is a second gear or idler 105. Second gear 105 meshes with third gear 106 which is also an idler. Third gear 106 meshes with driven gear 53. It will be remembered that driven gear 53 is carried on shaft 41 which also carries left-hand indexing member 38. In this manner the motor is drivingly connected to the indexing member 38. In the preferred arrangement, gears 104, 105 and 106 are of the same diameter and have the same number of teeth, while driven gears 52 and 53 are of the same diameter and have the same number of teeth. The two indexing members 37 and 38 are preferably arranged so that they occupy the same relative angular position. This point may be understood by considering FIGURE 1. With the drive train just outlined, rotation of the shaft 57 through a given angle will cause rotation of each of the indexing means 37 and 38 through a corresponding, but different angle.

FIGURES 6 through 11 illustrate different stages in the operating sequence of the preferred embodiment. The cycle shown in these figures is preferably repeated for each brewing sequence. An understanding of the function of the various items of electrical control equipment which have been mentioned heretofore can be gained from a consideration of the diagrams of FIGURES 6 through 11.

The starting position of the unit is shown in FIGURE 6. It should be noted that in this figure a cartridge C is positioned in the brewing housing 22, but the housing itself is open. Valve V-1 in the feed line between the reservoir 64 and the housing 22 is closed. Valve V-2 in the cold water line and the reservoir is also closed. The reservoir is in its loaded condition. That is to say, the diaphragm 82 is extended downwardly and the drive spring 95 is compressed. As a consequence, switch SW-4 is in its actuated position.

With the machine in this condition it is started by the customer, for example, when he depresses the control button not shown or places the requisite amount of money in the coin mechanism 51 (see FIGURE 2). The motor 55 starts and as it turns through a portion of a revolution crank 58 closes the brewing housing. The motor is stopped after shaft 57 and crank 58 have moved through a part of a revolution by switch SW-1 being actuated by cam 60 (see FIGURE 2). Actuation of switch SW-1 also opens valve V-1. The drive spring 95 begins to extend and in doing so forces water out through valve V-1 through the feed line to the brewing chamber. The passage of the hot water through the beverage material in the brewing chamber creates the beverage or extract which flows from the outlet of the brewing chamber into a cup 107. This portion of the operating cycle appears in FIGURE 7 where it can be seen that the diaphragm is being moved upwardly by spring 95 and that switch SW-4 is no longer held closed by actuating bar 67 which is interconnected with the diaphragm.

The spring continues to expand, forcing the diaphragm further into the reservoir. This portion of the operating cycle is shown in FIGURE 8. At the top of the stroke of the spring, the actuating bar 67 trips switch SW-3. Actuation of this switch closes valve V-1 thus cutting off the flow of water to the brewing chamber and stopping the upward movement of the diaphragm. Closure of switch SW-3 also opens input valve V-2.

The pressure existing in the water lines of the building to which input line 74 is connected forces water to flow through valve V-2 into the reservoir. As the water flows into the reservoir it forces the diaphragm outwardly and compresses spring 95. Actuating bar 67 moves downwardly as a consequence and actuates switch SW-4. Actuation of this switch closes valve V-2 and at the same time starts the motor. This state of affairs is illustrated in FIGURE 9. As shaft 57 is turned by the motor through a portion of a revolution, the crank 58 moves upwardly and permits the brewing chamber 22 to open, as shown in FIGURE 10. The valves V-1 and V-2 remain closed during this portion of the cycle. After the motor has rotated shaft 57 through approximately 120°, the brewing chamber has been opened far enough to permit movement of the cartridge tape 35 through the open housing. The Geneva drive engages the Geneva wheel at this point and through the drive system rotates the indexing means 37 and 38. As shown in FIGURE 11, rotation of the indexing means moves spent cartridge C out of the brewing housing and brings fresh cartridge C' into the brewing housing. Shaft 57 rotates through a further 120° so that it has completed one full revolution since the motor first started. As the revolution is completed, the cam 61 (see FIGURE 2) operates switch SW-2 to stop the motor. In this way the unit has been brought through a full cycle and the conditions shown in FIGURE 6 exist once again. During the time that the cartridge tape is being advanced through the open brewer housing, valves V-1 and V-2 both remain closed.

From the foregoing description, it can be seen that in the unit shown in the drawings, the amount of fresh cold water admitted to the reservoir in the course of a cycle is a sizeable fraction of the capacity of the reservoir. For example, a reservoir holding about five cups has been found to be quite useful in a machine designed to brew one cup of coffee at a time. It should also be understood that sotisfactory brewing of most beverages is dependent, in part, upon the use of water which is just below the boiling point in temperature. Because of these considerations, it is preferred that special steps be taken to insure that the unit is not placed in condition to go through a new cycle until the heating element has had time to raise the mixture of approximately four cups of hot water and one cup of cold water to the standard brewing temperature. This is accomplished by means of the thermostat 71 which also controls the on-off operation of the heating element. One set of contacts in the thermostat is wired in series with switch SW-1 which initially opens valve V-1, thus disabling this valve temporarily while the heating element is bringing the water up to brewing temperature.

I claim:

1. Apparatus for brewing a beverage, the apparatus being adapted for use with a tape having a series of liquid permeable pods of beverage material carried in spaced relation along said tape, the apparatus comprising a pair of members arranged for relative movement toward and away from a position of engagement with one another in which they cooperate to define a beverage extraction chamber, one of said members having an inlet port for the introduction of hot water thereinto, and the other having an outlet port for the discharge of extract therefrom, means for conveying said tape through said apparatus and for sequentially positioning successive beverage pods between said relatively movable members, a hot water reservoir having a movable wall, spring means biased against said movable wall to urge it in a direction tending to reduce the volume of said reservoir and thereby develop pressure to expel the water, an input line connected to said reservoir and adapted to be connected to an outside source of water under line pressure, a selectively operable input valve positioned in said input line for selectively admitting water from said outside source into said reservoir, a feed line connected between the reservoir and the inlet port on said relatively movable member, a selectively operable discharge valve mechanism positioned in the feed line for selectively discharging hot water from the reservoir to the beverage extraction chamber defined by said relatively movable members, said valve mechanism including a valve member having two positions, one in which it closes the outlet passage and a second in which the passage is opened, and a heating element for heating the water while the water is in said reservoir.

2. Apparatus for sequentially brewing a beverage by forcing a measured quantity of hot water through separate masses of beverage material, comprising a beverage extraction housing for enclosing one of said masses of beverage material while hot water is forced through it, said extraction housing having an inlet port for introduction of hot water to the interior thereof and an outlet port for discharge of beverage therefrom, a hot water reservoir having a movable wall, a heater for heating the water while the water is in said reservoir, yielding means biased against said movable wall to urge it in a direction tending to reduce the volume of said reservoir, an input line connected to said reservoir and adapted to be connected to an outside source of water under line pressure, a selectively operable input valve positioned in said input line for selectively admitting water from said outside source into said reservoir, a feed line connected between the reservoir and the inlet port on the extraction housing, a selectively operable discharge valve positioned in the feed line for selectively discharging hot water from said reservoir to the beverage extracting housing, and means controlled by said movable wall for closing said discharge valve whereby only said measured quantity of hot water is discharged.

3. Apparatus for sequentially brewing portions of a a beverage by forcing a predetermined volume of hot water through separate masses of beverage material for each such portion comprising a beverage extraction housing for enclosing one of said masses of beverage material while hot water is forced through it, said extraction housing having an inlet port for introduction of hot water to the interior thereof and an outlet port for discharge of beverage therefrom, a hot water reservoir having a movable wall, yielding means biased against said movable wall to urge it in a direction tending to reduce the volume of said reservoir, said reservoir being adapted to hold a volume of water substantially larger than said predetermined volume, a heater for heating the water in said reservoir, an input line connected to said reservoir and adapted to be connected to an outside source of water under line pressure, a selectively operable input valve positioned in said input line for selectively admitting water from said outside source into said reservoir, a feed line connected between the reservoir and the inlet port on the extraction housing, a selectively operable discharge valve positioned in the feed line for selectively discharging hot water from said reservoir to the beverage extracting housing, and valve control means for opening said discharge valve, said valve control means including means operable by movement of the movable wall when said predetermined volume of water is discharged for closing said discharge valve and for then opening the input valve, said valve control means further including means operable by said movable wall for closing the input valve when the predetermined volume of water is replenished.

4. Apparatus for brewing a beverage by forcing hot water through separate masses of beverage material, comprising a beverage extraction housing for enclosing one of said masses of beverage material while hot water is forced through it, said extraction housing having an inlet port for introduction of hot water to the interior thereof and an outlet port for discharge of beverage therefrom, a hot water reservoir having a movable diaphragm forming a wall thereof, yielding means biased against said movable wall to urge it in a direction tending to reduce the volume of said reservoir, a heater for said reservoir, an input line connected to said reservoir and adapted to be connected to an outside source of water under line pressure, a selectively operable input valve positioned in said input line for selectively admitting water from said outside source into said reservoir, a feed line connected between the reservoir and the inlet port on the extraction housing, a selectively operable discharge valve positioned in the feed line for selectively discharging hot water from said reservoir to the beverage extracting housing, an upwardly open liquid tray below the extraction housing and reservoir, means mounting the liquid tray with freedom for downward movement under the influence of accumulation of liquid in the tray, and control means operative in response to downward movement of the tray to shut off the input line.

5. A construction according to claim 4 in which the control means includes a safety shut-off valve in the input line located upstream of said input valve.

6. Apparatus for sequentially brewing servings of a beverage, the apparatus being adapted for use with a tape having a series of liquid permeable pods of beverage material carried in spaced relation along said tape, the apparatus comprising a beverage extraction housing having an inlet port for the introduction of measured quantities of hot water to the interior thereof and having an outlet port for the discharge of beverage therefrom, said housing being formed of separable parts providing for entry of said tape therebetween, power actuated tape engaging means for advancing said tape into and through said extraction housing while the parts thereof are separated, power actuated means for separating and closing the beverage extraction housing, hot water supply means comprising a reservoir of variable volume, the measured quantity of water being a fraction of the total volume of said reservoir, a heater within said reservoir, a selectively operable cold water valve, a line connecting said valve to said reservoir said valve being adapted to be connected to an outside source of water under line pressure, a selectively operable hot water valve, a line connecting said valve to said reservoir and to said beverage extraction housing, said line being connected to the top of the reservoir, a movable wall in said reservoir, a spring acting on said wall of said reservoir to reduce the volume of said reservoir, said wall and said spring being arranged to force the upper strata of water in said reservoir out of said port, control mechanism for said apparatus including a control member connected to said reservoir and movable upon variation in the volume thereof, switch means operable by said control member for closing said hot water valve and for opening said cold water valve when the measured quantity of water is discharged and then opening said cold water valve, said switch means being further operable to close said cold water valve when said reservoir is filled, and switch means operable by the power actuated beverage housing separating and closing means upon the closing of the beverage housing for opening said hot water valve.

7. Apparatus of the kind described including mechanism for brewing a beverage by forcing hot water through masses of beverage material, said mechanism including a reservoir for storing a supply of water, an outlet line leading from said reservoir and a discharge valve in said outlet line, a movable wall in said reservoir and yielding means biased against the movable wall and serving to urge it in a direction tending to discharge hot water from the reservoir through a mass of beverage material, a heater for heating the water while the water is in said reservoir, an input line connected to the reservoir and adapted to be connected to an outside source of water under line pressure, a selectively operable input valve in said input line for selectively admitting water to said reservoir, and control means operable to open the said discharge valve to permit the discharge of water from the reservoir and means connected to said movable wall and controlled thereby for opening said input valve and for closing said discharge valve to seal said outlet line immediately upon the delivery of a predetermined volume of water from the reservoir.

8. Apparatus for sequentially brewing servings of a beverage, the apparatus being adapted for use with a tape having a series of liquid permeable pods of beverage material carried in spaced relation along said tape, the apparatus comprising a pair of members arranged for relative movement toward and away from a position of engagement with one another in which they cooperate to define a beverage extraction chamber, one of said members having an inlet port for the introduction of hot water thereinto, and the other having an outlet port for the discharge of extract therefrom, means for conveying said tape through said apparatus and for sequentially positioning successive beverage pods between said relatively movable members, a hot water reservoir having a movable wall, a heater for heating the water while the water is in said reservoir, yielding means biased against said movable wall to urge it in a direction tending to reduce the volume of said reservoir, an input line connected to said reservoir and adapted to be connected to an outside source of water under line pressure, a feed line connected between the reservoir and the inlet port on said relatively movable member, and mechanism for sequentially delivering a charge of water from the reservoir into said feed line under the influence of said yielding means, and then closing the feed line and opening the input line.

9. Apparatus according to claim 2 wherein said reservoir has a volume substantially larger than the volume of water discharged upon movement of said movable wall by said biasing means.

10. Apparatus according to claim 9 wherein said heater is within said reservoir.

11. Apparatus according to claim 3 further including a heater control means operable by said movable wall means for disabling said heater when said predetermined volume of water is discharged, said heater control means being re-operable by said wall to reactivate said heater when the supply of water in the reservoir is replenished.

12. Apparatus according to claim 7 wherein the said control means is operable by said movable wall to limit the volume of water discharged from the reservoir to a fraction of the volume of said reservoir, and further including a discharge connection at the top of the reservoir whereby the hottest water in said reservoir is discharged by said control means.

References Cited

UNITED STATES PATENTS

| | | | |
|---|---|---|---|
| 2,615,384 | 10/1952 | Ranz | 99—282 |
| 2,866,331 | 12/1958 | Michie | 222—335 X |
| 3,143,954 | 8/1964 | Nesmith | 99—289 |
| 3,179,035 | 4/1965 | Lockett | 99—283 X |
| 3,194,448 | 7/1965 | Theall | 222—335 |

FOREIGN PATENTS 1,167,814  8/1958  France.

WALTER A. SCHEEL, Primary Examiner.

S. P. FISHER, Assistant Examiner.